United States Patent
Nelson

(10) Patent No.: US 6,668,290 B1
(45) Date of Patent: Dec. 23, 2003

(54) SYSTEM AND METHOD FOR CONTROLLING READOUT OF FRAME DATA FROM BUFFER

(75) Inventor: Michael A. Nelson, Portland, OR (US)

(73) Assignee: Crossroads Systems, Inc., Austin, TX (US)

( * ) Notice: Subject to any disclaimer, the term of this patent is extended or adjusted under 35 U.S.C. 154(b) by 497 days.

(21) Appl. No.: 09/695,758

(22) Filed: Oct. 24, 2000

Related U.S. Application Data

(60) Provisional application No. 60/202,838, filed on May 8, 2000.

(51) Int. Cl.[7] .............................................. G06F 5/06
(52) U.S. Cl. ........................... 710/52; 710/57; 370/470; 709/250
(58) Field of Search ..................... 710/52, 57; 709/212, 709/250; 711/100, 154, 167; 370/470, 471

(56) References Cited

U.S. PATENT DOCUMENTS

| | | | |
|---|---|---|---|
| 5,488,724 A | * | 1/1996 | Firoozmand ................. 709/212 |
| 5,691,984 A | * | 11/1997 | Gardner et al. ............. 370/401 |
| 5,872,920 A | * | 2/1999 | Hausman et al. ........... 709/250 |
| 6,105,086 A | * | 8/2000 | Doolittle et al. .............. 710/52 |
| 6,151,307 A | * | 11/2000 | Gauthier et al. ............ 370/248 |

FOREIGN PATENT DOCUMENTS

EP   0 412 267 A2   2/1991   ............. G06F/5/06

* cited by examiner

*Primary Examiner*—Kim Huynh
(74) *Attorney, Agent, or Firm*—Gray Cary Ware & Freidenrich, LLP

(57) ABSTRACT

Systems and methods for reading a stream of high-speed data without interrupting the data or reading beyond the end of a desired frame. In one embodiment, a method comprises: receiving a plurality of frames, wherein each frame includes a plurality of words, wherein each frame includes an end-of-frame (EOF) delimiter in the last word in the frame; storing the plurality of frames in a buffer, wherein each word in each frame is stored with an early-end-of-frame (early_EOF) flag and wherein the early-end-of-frame flag is set if and only if the word immediately precedes the last word of the corresponding frame; and when a frame is to be read out of the buffer, sequentially reading words out of the buffer until a word in which the early_EOF flag is set is detected, then reading the word following the word in which the early_EOF flag is set and terminating the read.

30 Claims, 7 Drawing Sheets

SYSTEM AND METHOD FOR CONTROLLING READOUT OF FRAME DATA FROM BUFFER

This application claims the benefit of the filing date of U.S. Provisional Patent Application Ser. No. 60/202,838 by inventor Michael A. Nelson entitled "System and Method for Controlling Readout of Frame Data from Buffer," filed on May 8, 2000.

FIELD OF THE INVENTION

The invention relates generally to data communication in computer systems, and more particularly to a system and method implemented in connection with a FIFO frame buffer for preventing overreading of data from the buffer.

BACKGROUND OF THE INVENTION

Advances in computer technologies have resulted in increased processing power and the use of increasingly data-intensive computer applications. Accordingly, there is a greater need for high-performance data links and networking applications to support the interconnected computers, storage devices, displays, I/O devices, and other peripherals.

Traditional data links between interconnected devices often cannot operate at sufficiently high speeds to support current systems. Consequently, Fibre Channel communication links, which provide very high-speed, low-latency, full-duplex data communications, are increasingly being used to meet the data transfer requirements of these systems.

Fibre channel systems provide a transport mechanism in which frames are used to transfer data. The frames contain the data to be transmitted, as well as the addresses of the source and destination ports, and link control-information. Each frame includes delimiters which identify the beginning and end of the frame and thereby allow frames to be written and read individually.

While the frames are well defined and easily identifiable as a result of the delimiters, the speed of the data transfer may be too great for the read or write logic to respond to the delimiters and stop reading or writing at precisely the end of the frame. This may cause a number of problems. For example, if the frame is stored in a FIFO and is destructively read out of the FIFO, data beyond the end of the frame may be read out and lost. (Once the data is read out of the FIFO, it cannot be returned to the FIFO—if it cannot be transmitted to another device or stored in another memory, it is lost.)

SUMMARY OF THE INVENTION

One or more of the problems outlined above may be solved by the various embodiments of the invention which, broadly speaking, comprises a system and method for reading a stream of high-speed data without interrupting the data or reading beyond the end of a desired frame of data.

In one embodiment, the system comprises a receive buffer which is coupled to associated write logic and read logic. A data stream is delivered to the system, wherein the data stream comprises a plurality of frames. Each frame comprises a plurality of words, wherein a first word is identified by a start-of-frame (SOF) delimiter and a last word is identified by an end-of-frame (EOF) delimiter. The buffer is configured to be accessed by the read and write logic in a first-in-first-out fashion. In one embodiment, the write logic includes two serial pipeline stages through which received words pass. The word in the first stage is examined to determine whether it comprises an EOF delimiter. If it is an EOF delimiter, the write logic sets an early-end-of-frame (early_EOF) bit in the word which is in the second pipeline stage. As a result, the early_EOF bit is set in the penultimate, or next-to-last, word in each frame. When it is desired to read a frame out of the buffer, the read logic is configured to start reading words out of the buffer. As each word is read out, it is examined by the read logic to determine whether the corresponding early_EOF bit is set. If this bit is not set, the read logic does not anticipate the end of the frame and continues to read successive words out of the buffer. When the read logic reads a word out of the buffer and the early_EOF bit is set in that word, the read logic anticipates the end of the frame and prepares to stop reading after the next word (which is the last word in the frame.) The system thereby provides sufficient setup time for the read logic to stop reading words out of the buffer before reaching the next frame.

In one embodiment, the method comprises modifying the frames of data which are written into a receive buffer to indicate the next-to-last word in each frame. Each frame comprises a plurality of words, wherein a first word is an SOF delimiter and a last word is an EOF delimiter. As the words of a frame are received, they are examined to determine whether each is the last word in the frame, as indicated by the EOF delimiter. Each word is written into a receive buffer, along with an early_EOF bit which indicates whether the word is the next-to-last word in the frame. If the early_EOF bit is set, the corresponding word is the next-to-last word in the frame. The frames are read out of the buffer in the order in which they were written to the buffer (first-in-first-out.) When it is desired to read a frame out of the buffer, a read operation is initiated. As each word of a frame is read out of the buffer, the word is examined to determine whether its early_EOF bit is set or cleared. If the early_EOF bit is cleared, successive words are read out of the buffer until a word having its early_EOF bit set is encountered. If the early_EOF bit is set, the next word is read and then the read operation is terminated.

BRIEF DESCRIPTION OF THE DRAWINGS

Other objects and advantages of the invention may become apparent upon reading the following detailed description and upon reference to the accompanying drawings in which.

Figure 1A:
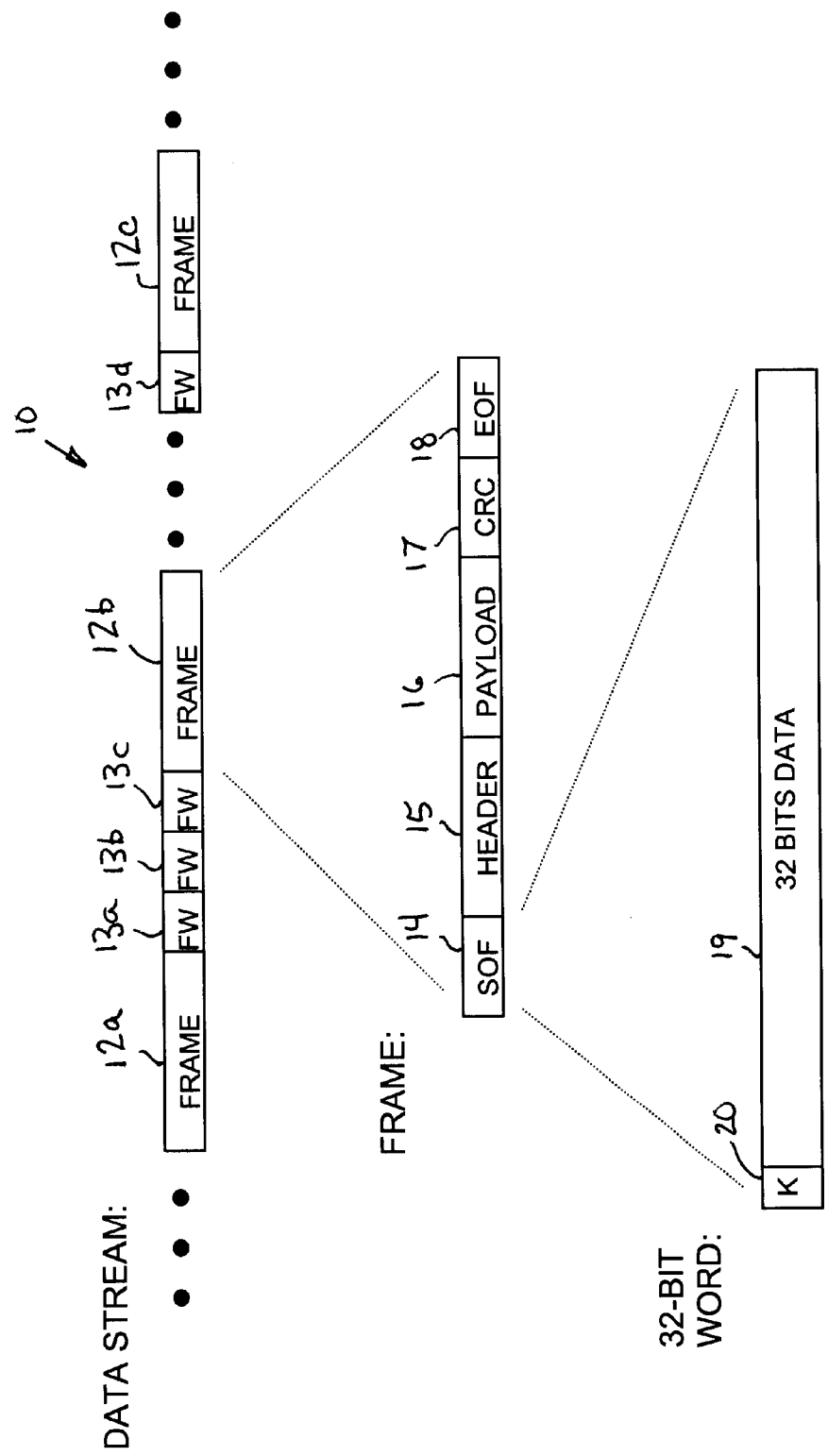
FIGS. 1a–1c are diagrams illustrating the structure of a received data stream and stored half-words in one embodiment.

While the invention is subject to various modifications and alternative forms, specific embodiments thereof are shown by way of example in the drawings and the accompanying detailed description. It should be understood, however, that the drawings and detailed description are not intended to limit the invention to the particular embodiment which is described. This disclosure is instead intended to cover all modifications, equivalents and alternatives falling within the spirit and scope of the present invention as defined by the appended claims.

DETAILED DESCRIPTION OF THE PREFERRED EMBODIMENT

A preferred embodiment of the invention is described below. It should be noted that this embodiment and other embodiments described below are exemplary and are intended to be illustrative of the invention rather than limiting.

Broadly speaking, the invention comprises a system and method for terminating a read of a frame of data out of a buffer without overrunning the frame and reading out part of a subsequent frame. (It should be noted that, while the description below focuses on a Fibre Channel switch, this is exemplary, and the present invention may be implemented in a variety of different devices, such as host bus adapters, disk drive arrays and the like.) In one embodiment, a mechanism is implemented in a Fibre Channel switch to provide early identification of the end of each frame and thereby enable the associated read logic to stop reading at the end of each frame. In this embodiment, the data stream is held in a FIFO that stores one half-word at a time. The width of the half-words in this embodiment is increased by one bit. The extra bit comprises a flag indicative of whether the succeeding word is the last word of the frame. When the flag is detected, the read logic reads the next word out of the FIFO and then stops.

This mechanism may have several advantages over other systems: it may allow the use of less expensive components than other systems; it is not necessary for the mechanism to have advance knowledge of the length of each frame; The mechanism eliminates the need for pad bytes which are added by some other systems to account for overreading; the mechanism is useful for both destructive (FIFO) and non-destructive (RAM) access buffers (although it is especially advantageous for destructive devices); the mechanism may allow streaming data to be transferred at real time data rates without interruption; and the mechanism may allow the use of a registered read controller instead of a combinatorial controller, which would have to react more quickly.

"Fibre Channel" refers to an data communication technology, as well as a set of standards being developed by the American National Standards Institute (ANSI) to define the technology. Fibre Channel supports both shared media and dedicated, or switched, media. Fibre Channel can be used to provide means for data transfer in many different systems, supporting workstation clusters, switched LANs, SANs (storage area networks) and the like.

Despite its name, "Fibre Channel" technology is not strictly a channel-oriented technology, nor does it represent a network topology. Fibre Channel allows devices to be interconnected in a more generalized scheme. In this scheme, devices may be connected by Fibre Channel links in several configurations, including point-to-point and loop configurations, as well as what is referred to as a "fabric." The fabric is formed by one or more interconnected Fibre Channel links and switches. Devices can then be interconnected through the fabric. The fabric may be a circuit switch, an active hub or a loop. These devices may be cascaded together to increase the number of available ports in the fabric.

Each Fibre Channel link consists of a pair of unidirectional fibers. Each fiber is connected to an associated transmitter and receiver. The link is connected between a pair of data ports. Data is transmitted from a first one of the ports to a second one of the ports over a first one of the fibers (and the corresponding transmitter and receiver.) Data which is transmitted from the second port to the first port is carried on the second fiber. The transmitters and receivers are managed by controllers at the respective ports.

As noted above, the Fibre Channel fabric may include one or more interconnected switches. Each of these switches is configured to receive and buffer frames of data from a source, make routing decisions for the frames, and transmit the frames to the appropriate destinations. Because of the extremely high data rates of Fibre Channel systems, the problem of overreading data may be particularly acute in these systems.

In one embodiment of the present system, a Fibre Channel switch buffers the frames in a first-in-first-out (FIFO) storage unit (a buffer). As each frame is received, it is loaded into the FIFO buffer. The frames are read out of the FIFO buffer, one at a time, in the order in which they were loaded into the FIFO buffer.

The boundaries of the frames are determined by the first and last words contained in the respective frames. The first word in each frame comprises a start-of-frame (SOF) delimiter, and the last word in each frame comprises an end-of-frame (EOF) delimiter. When a frame is read out of the FIFO buffer, the first word is read out, then each subsequent word is read out until the last word is read. When the last word (identified by the EOF delimiter) is read out, the read terminates.

It should be noted that the preferred embodiment handles the data in half-words rather than full 32-bit data words. Thus, while the present system and method will be described in terms of half-words, they are generally applicable to the handling of full words or fractions of words other than half-words.

Because the speed of the data transfer in the Fibre Channel system is so high, the speed limitations of some logic circuits may not allow them to detect the EOF delimiter at the end of a frame and to react quickly enough to stop after reading the last word. Consequently, the present system incorporates a mechanism to provide early notification that the last word of a frame is about to be received, thereby enabling the logic to stop reading data out of the FIFO at precisely the right point.

In one embodiment of the present system, an extra bit is added to each half-word in a frame. The extra bit serves as a flag which indicates whether the succeeding word is the last word in the frame. (It should be noted that the flag may comprise more than one bit in other embodiments, but a single bit is sufficient in this embodiment.) Upon detecting the flag (the early_EOF bit which is set,) the read logic becomes aware that the next word is the last word of the frame and, as a result, can prepare to stop reading immediately after the last word.

It is assumed in the embodiment described in detail below that received words do not already include an early_EOF flag. It should be noted that, in some embodiments, the early_EOF flag may already be present, in which case the write logic can either store the words as received, or check the words to ensure that the early_EOF flags are properly set or cleared. Similarly, the read logic may include the early_EOF flags in the data words which are output, or it may strip the early_EOF flags from the output words, depending upon the needs of the particular implementation of the system.

While the embodiment of the present system which is described here uses a flag which is set in the next-to-last word in each frame, it should be noted that, in other embodiments, the word containing the early-EOF flag may precede the last word by more than one word. For example, the early_EOF flag may be set in a word which precedes the last word by two, three, or any predetermined number of words. This may be necessary to provide additional time for the logic to react to identification of the flag.

Referring to FIG. 1, a diagram illustrating the structure of a data stream received by a Fibre Channel switch is shown. Data stream 10 comprises a plurality of frames 12. (It should be noted that, for the purposes of this disclosure, identical items in the figures may be indicated by identical reference numerals followed by a lowercase letter, e.g., 12a, 12b, and so on. The items may be collectively referred to herein simply by the reference numeral.) Frames 12 are typically separated by a plurality of fill words 13. Each of frames 12 comprises a plurality of words which form an SOF delimiter 14, a header 15, a payload 16, a cyclic redundancy check value (CRC) 17 and an EOF delimiter 18. Finally, each of the words which comprises a frame in the data stream consists of 32 bits of data 19 and a K character bit 20.

Data 20 carries most of the information corresponding to each of the parts of the frame (i.e., the SOF and EOF delimiters, header, payload and CRC.) If K character bit 20 is set, it indicates that the word is a special word. For example, The SOF and EOF delimiters are special words for which the corresponding K character bits are set. It should be noted that there are special words other than the SOF delimiter and the EOF delimiter. Therefore, when a device is monitoring an input data stream to detect a frame, it must detect an SOF delimiter as distinct from other special words. That is, it must detect words for which the K character bit is set, then determine whether the 32 bits of data within the corresponding word indicate that it is a SOF delimiter. The detection of an EOF delimiter is somewhat easier, since no special words are allowed between the SOF delimiter and the EOF delimiter. Consequently, it can be assumed that the next special word (i.e., word with the K character bit set) is the EOF delimiter without having to check the corresponding 32 bit data to verify that it corresponds to an EOF delimiter.

Figure 1B:
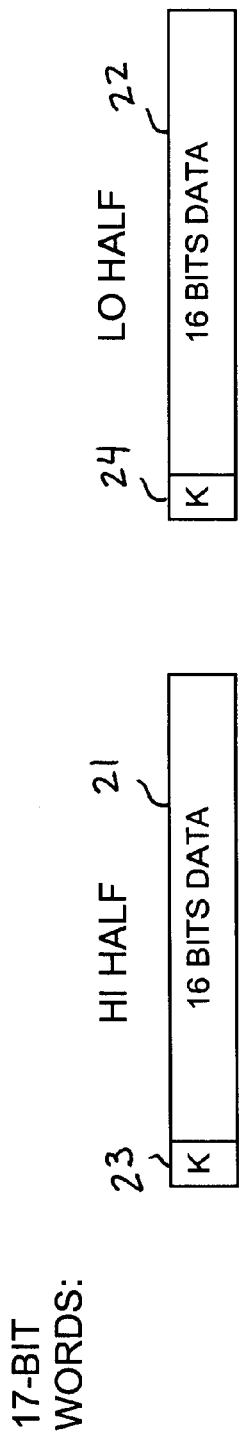
Figure 1C:
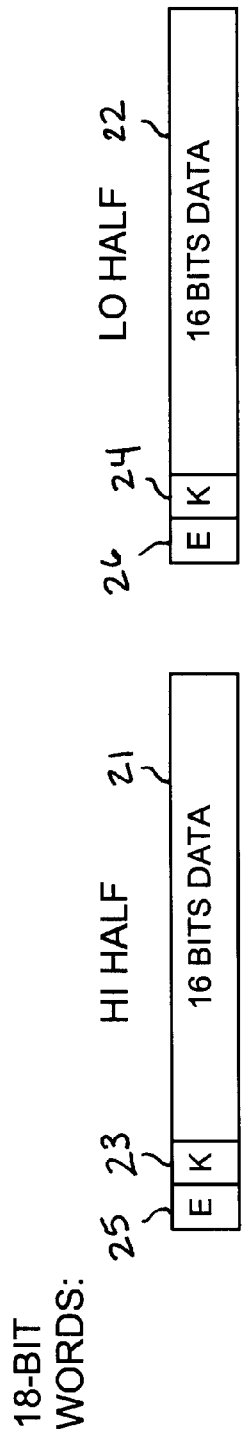

When each word is received by the switch, it is stored in a buffer in the receiving device. Referring to FIGS. 1b and 1c, in the preferred embodiment, the words are actually stored as half-words 21 and 22 (see FIG. 1b.) Each half-word has a bit, 23 and 24, respectively, corresponding to K character bit 20. Bit 24 (the bit corresponding to the K character bit in the low half-word) is always false. Bit 23 (the bit corresponding to the K character bit in the high half-word) has the same value as K character bit 20—if K character bit 20 is true, bit 23 is true; if K character bit 20 is false, bit 23 is false.

Further, an extra bit 25, 26 is added to each half-word and the modified half-words are stored in the device's receive buffer (see FIG. 1c.) Bits 25 and 26 are early-end-of-frame (early_EOF) bits. Bit 25 (the bit corresponding to the early_EOF bit in the high half-word) is always false. Bit 26 (the bit corresponding to the early_EOF bit in the low half-word) is true if the succeeding word is the EOF delimiter (i.e., if the bit 23 of the succeeding half-word is true.)

When early_EOF bit 26 is set, it indicates that the last word of the frame is about to be encountered. As noted above, frames are read out of the receive buffer one at a time, and more specifically, one half-word at a time. When it is desired to read the next frame out of the buffer, read logic coupled to the buffer begins reading half-words from the head of the buffer. As each half-word is read out of the buffer, the early_EOF bit is examined. If the early_EOF bit is false (i.e., not set,) the logic continues to read succeeding half-words from the buffer. If the early_EOF bit is set, the read logic reads the next two half-words and then stops. The read logic thus has additional time equivalent to one half-word to prepare to stop reading (as compared to prior art systems which require that the read operation be stopped upon reading the last word.)

It should be noted that, while the description herein refers to "write logic" and "read logic," these need not be separate logic circuits. Moreover, the read and write logic may be implemented in a CPU which performs numerous functions other than simply making read and write accesses to the buffer.

Figure 2:
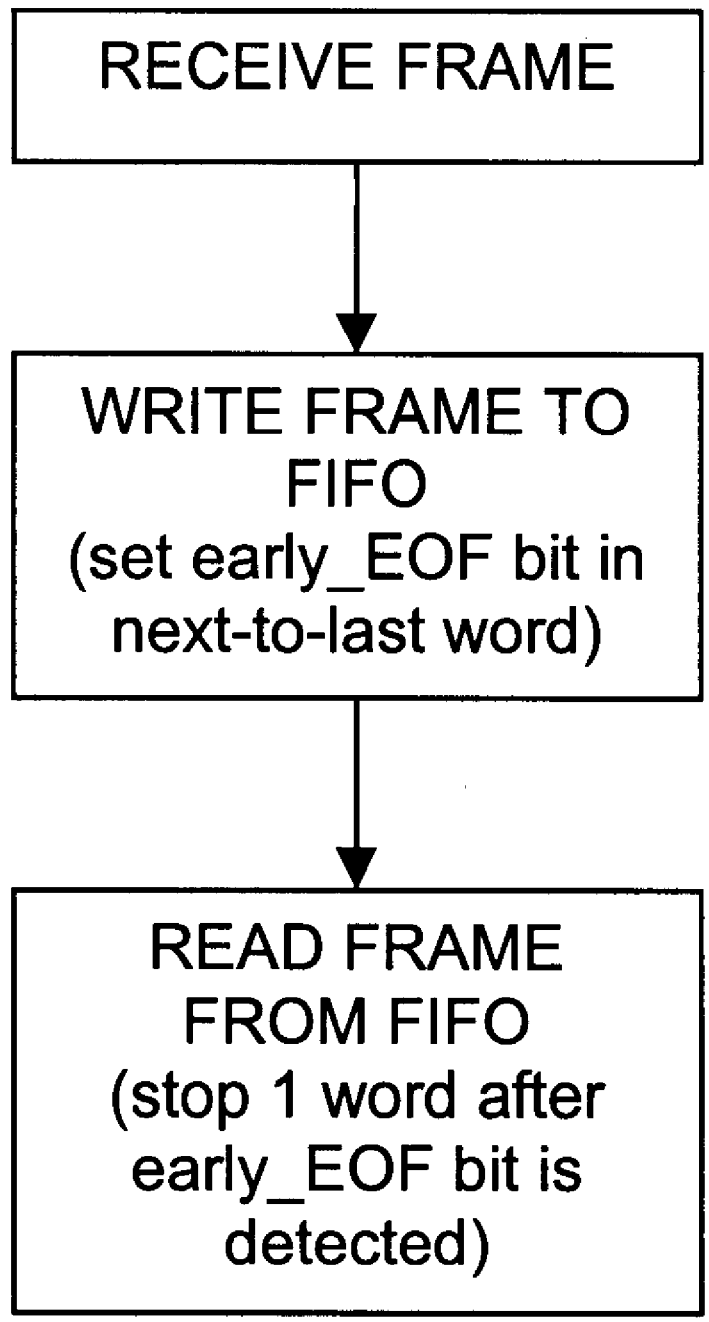
FIG. 2 is a top-level flow diagram illustrating the present method in one embodiment.

Referring to FIG. 2, a top-level flow diagram illustrating the method of one embodiment is shown. As noted above, this method is implemented in a Fibre Channel switch. A stream of data comprising a plurality of frames is received by the switch. When each frame is received by the switch, the frame is written to the receive FIFO of the switch. During this write operation, the next-to-last word of the frame is identified, and the early_EOF flag is set in that word. Later, when the frame is read out of the receive FIFO, each word of the frame is examined to determine whether the early_EOF flag of the word is set or cleared. When the next-to-last word of a frame (i.e., the one for which the early_EOF flag is set) is detected, the read logic reads one additional word, and then stops reading until it is desired to read out the succeeding frame.

Figure 3:
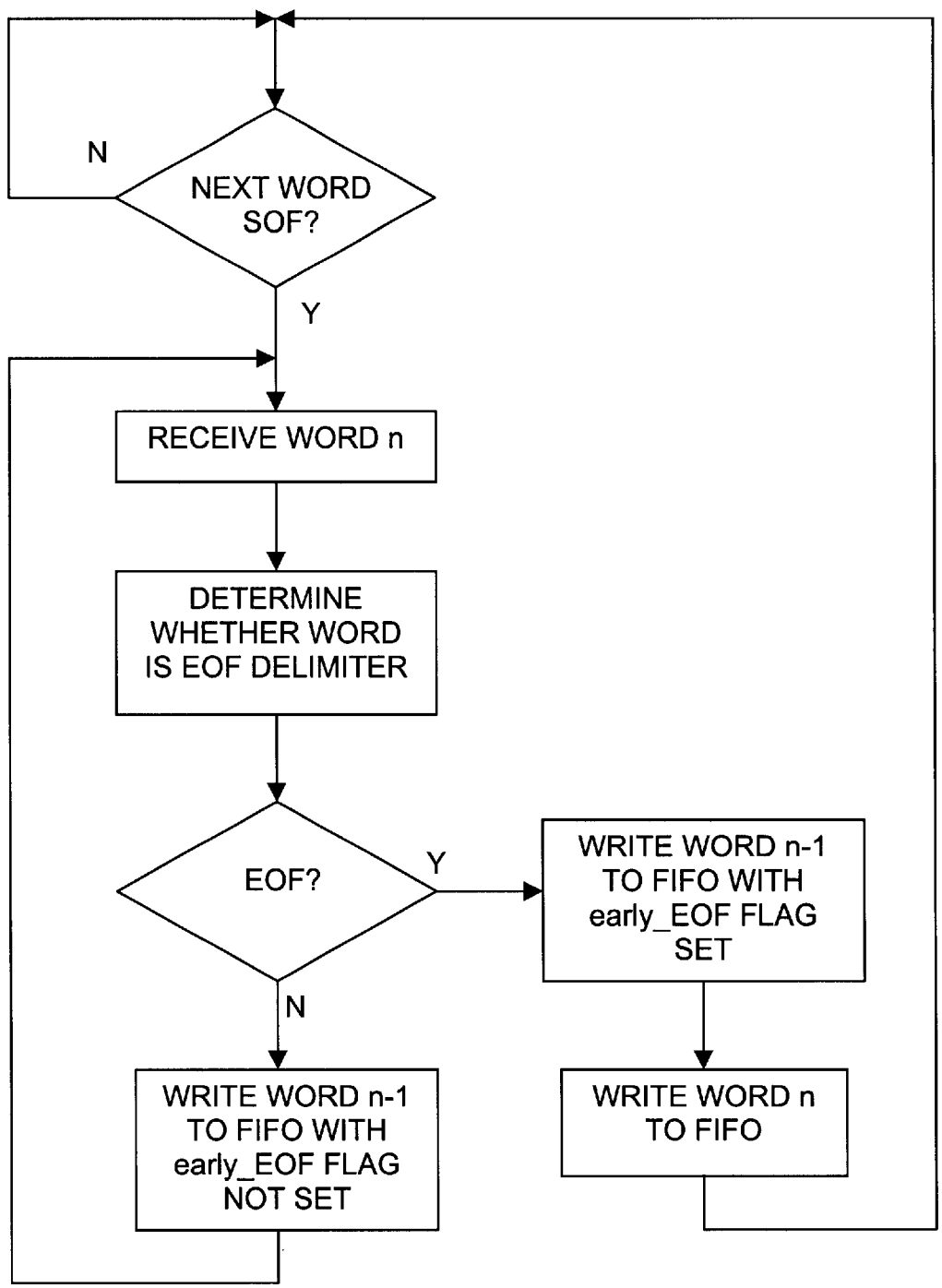
FIG. 3 is a flow diagram illustrating the operation in which frames are written to the receive FIFO in one embodiment.

Referring to FIG. 3, a flow diagram illustrating the operation in one embodiment in which frames are written to the receive FIFO is shown. As explained above, the received data stream comprises a plurality of frames, which in turn comprise a plurality of words. The write logic is configured to examine each word, then write the word to the receive FIFO.

Figure 4:
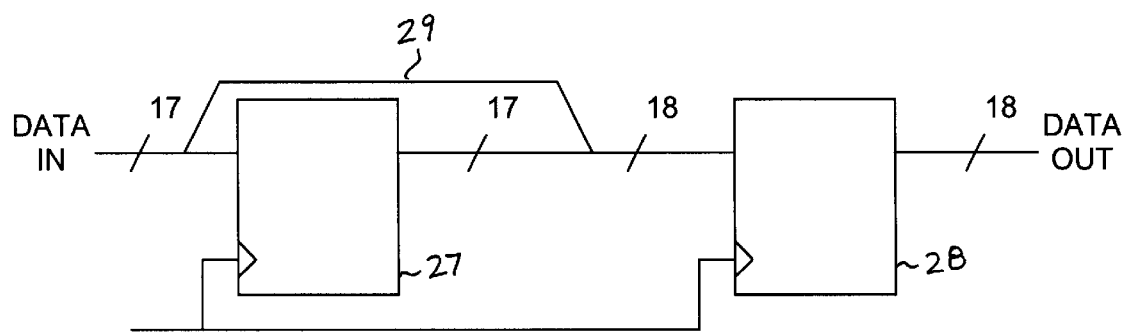
FIG. 4 is a functional block diagram illustrating a circuit configured to set early_EOF bits in half-words in one embodiment.

In the preferred embodiment, the early_EOF bit can be easily set using a circuit as illustrated in FIG. 4. In this figure, each half-word is routed through a pair of registers 27 and 28. As a 17-bit half-word is input to register 27, the corresponding K character bit is bypassed to the input of register 28 via line 29. The bit carried by line 29 is input to register 28 as the early_EOF bit of the preceding word, which now includes 18 bits.

In another embodiment, when one word is being examined, a previously received word is being written. The write logic can be configured to examine the words to determine whether their respective EOF flags are set. If the EOF flag of a word is set, the write logic can set the early_EOF flag of the preceding word when it is written to the receive FIFO. Thus, every word in which the EOF flag is set is immediately preceded by a word in which the early_EOF flag is set.

Figure 5:
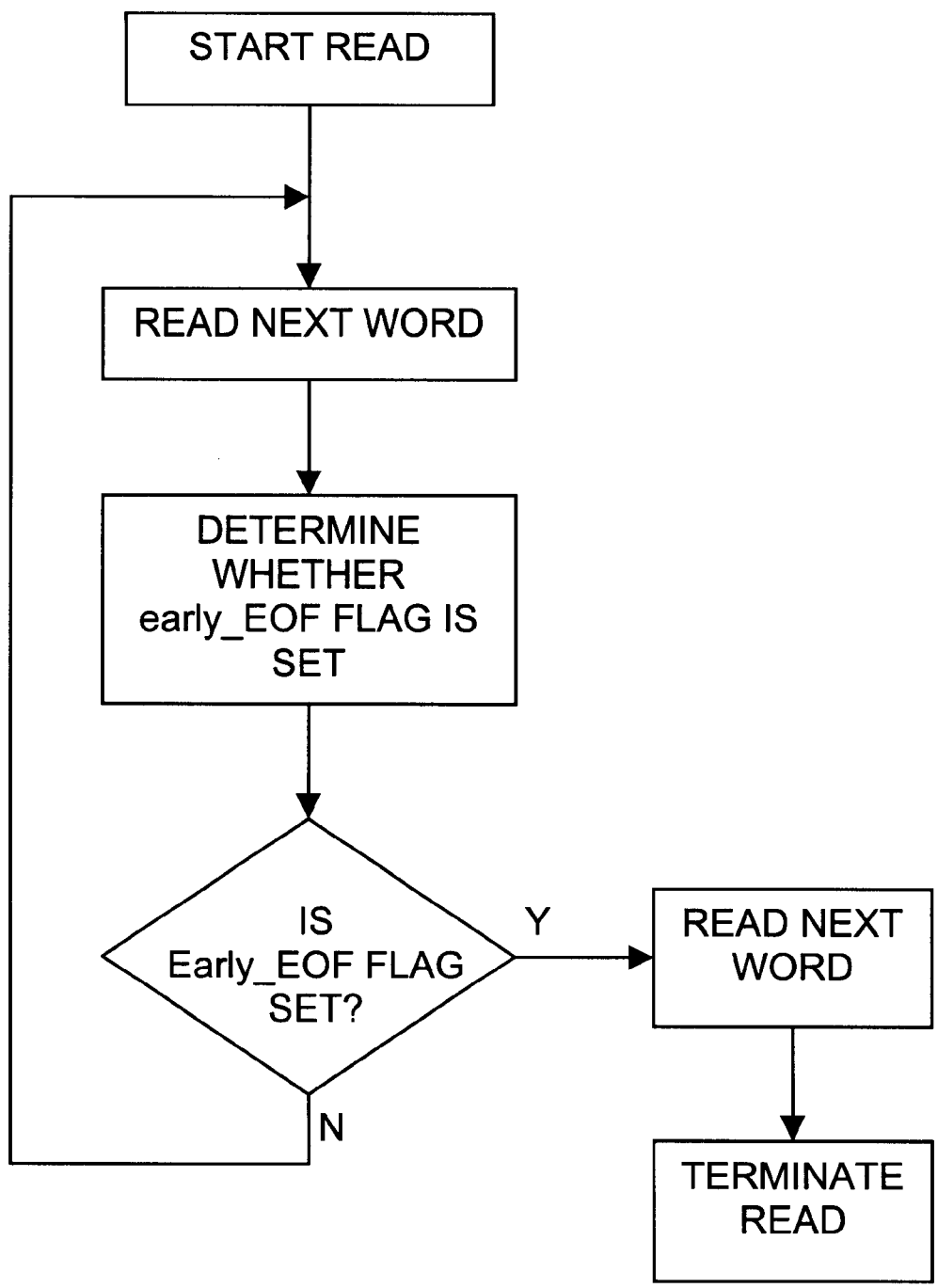
FIG. 5 is a flow diagram illustrating the operation in which frames are read from the receive FIFO in one embodiment.

Referring to FIG. 5, a flow diagram illustrating the operation in which frames are read from the receive FIFO is shown. The frames are read from the receive FIFO one at a time. When a read is initiated, the read logic reads the word at the head of the FIFO and examines it to determine whether the early_EOF flag is set. If the flag is not set, the last word of the frame is not anticipated, so the read continues normally. That is, the next word in the FIFO is read. This word is examined in the same manner as the first word to determine whether the early_EOF flag is set. This continues until the read logic encounters a word in which the early_EOF flag is set. If the early_EOF flag is set, the next word which will be read from the FIFO is the last word of the frame. Therefore, when the early_EOF flag is detected, the read logic prepares to stop reading, reads one more word, and then stops. When it is desired to read another frame from the FIFO, this process is repeated.

Figure 6:
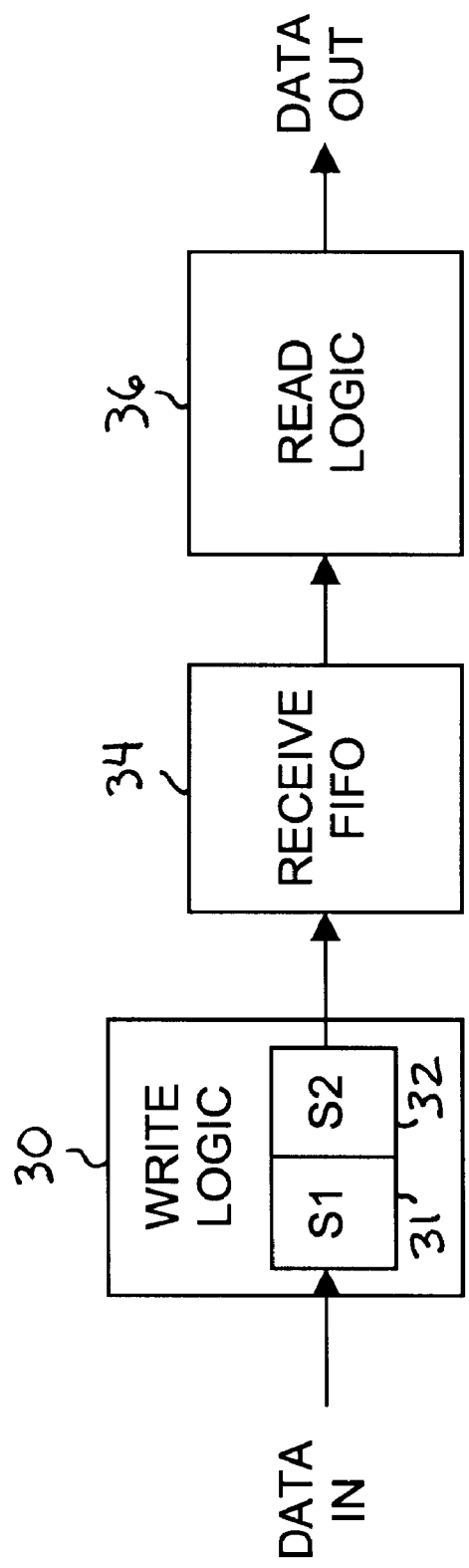
FIG. 6 is a functional block diagram of the present system in one embodiment.

Referring to FIG. 6, a functional block diagram of the system in one embodiment is shown. In this embodiment, the system is configured to operate in real time—data can be received in a continuous stream without pauses that might otherwise be used to process the received data. The system includes write logic 30, receive buffer 34 and read logic 36. Write logic 30 has two pipeline stages through which data passes. Each stages holds one data word. In the first stage 31, a data word is examined to determine whether the EOF bit therein is set. In the second stage 32, the early_EOF bit of a preceding word is set or cleared. The word in the second stage, including its early_EOF bit, is then written to the buffer. Whether the early_EOF bit is set or cleared depends upon whether the EOF bit of the following word (which is in first stage 31) is set or cleared. More specifically, if the EOF bit of the word in first stage 31 is set, the early_EOF bit of the word in second stage 32 will be set when it is written to the buffer. If the EOF bit of the word in first stage 31 is cleared, the early_EOF bit of the word in second stage 32 will be cleared when it is written to the buffer. In effect, the EOF bit of each word is the same as the early_EOF bit of the preceding word.

In this embodiment, it is contemplated that the receive FIFO is a destructive FIFO. That is, once a word is read out of the receive FIFO, it is either written to another location or lost. Thus, overreading one frame of data, i.e., reading out a portion (e.g., a word) of a succeeding frame, will destroy that portion of the succeeding frame. In other embodiments, however, the FIFO may be implemented using a random access memory (RAM) which is accessed in a circular manner. In such an embodiment, overreading a frame of data will not destroy the portion of the succeeding frame which is read, but some manipulation of the pointer which indicates the position of the succeeding frame will be required to reset it to the beginning of the frame.

It should be noted that, if the particular switch in which the present system is implemented already utilizes a plurality of pipeline stages to process the data words, the system can be used without adding any latency. If the switch does not have a plurality of pipeline stages, the stages of the present system will add the latency of one word to the processing time.

While the embodiment illustrated in FIG. 6 is designed to operate in real time, other embodiments which are not required to operate in real time are also possible. For example, the system could be configured in one embodiment to set the early_EOF bits of the appropriate words after they words are written to the FIFO. In this embodiment, the FIFO would be implemented as a circularly accessed RAM. In a circularly-accessed RAM, words are sequentially stored in and read from the RAM. After a word is stored in or read from the last storage location in the RAM, the access pattern "wraps around" so that the next word is stored in or read from the first storage location in the RAM. Using this type of buffer, a CPU could be configured to scan the RAM, examining each word to determine whether its EOF bit is set, and then setting the early_EOF bit of the preceding word.

The present system is believed to be an improvement over other possible solutions to the problem of overrunning the last word in a frame. One of these other solutions would be to replace the read logic with faster or more exotic logic. This logic, however, would also be more expensive and might therefore not be a practical solution. Another solution might be to use fixed-length frames and to simply count the number of words which have been read out of the FIFO. Placing this constraint on the transport mechanism, however, could make it less efficient than a system that uses variable-length frames. Another solution might be to simply plan to overrun each frame and to add a pad word between each frame. The pad word could then be read out and discarded. Again, this would reduce the efficiency of the transport mechanism.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within the following claims.

What is claimed is:

1. A method implemented in a frame buffer comprising:
   (a) receiving a frame of serial data, wherein the frame includes a plurality of words, each word including an end-of-frame bit;
   (b) sequentially writing the words of the frame into a buffer, wherein when each word of the frame is being written into the buffer, a subsequent word is being examined, wherein writing each word into the buffer includes
      setting an early-end-of-frame bit in the word if the end-of-frame bit of the subsequent word is set and
      clearing the early-end-of-frame bit in the word if the end-of-frame bit of the subsequent word is cleared; and
   (c) sequentially reading the words of the frame out of the buffer, wherein reading the frame out of the buffer comprises
      (i) reading one of the words from the buffer
      (ii) examining the early-end-of-frame bit of the one of the words and
         (A) if the early-end-of-frame bit of the one of the words is not set, repeating (i) and (ii)
         (B) if the early-end-of-frame bit of the one of the words is set, reading from the buffer one word following the one of the words for which the early-end-of-frame bit is set and then discontinuing reading words out of the buffer.

2. A method comprising:
   receiving a plurality of frames, wherein each frame includes a plurality of words, wherein each frame includes an end-of-frame (EOF) delimiter in the last word in the frame;
   storing the plurality of frames in a buffer, wherein each word in each frame is stored with an early-end-of-frame (early EOF) flag and wherein the early-end-of-frame flag is set if and only if the word immediately precedes the last word of the corresponding frame;
   when a frame is to be read out of the buffer, sequentially reading words out of the buffer until a word in which the early EOF flag is set is detected, then reading the word following the word in which the early EOF flag is set and terminating the read.

3. The method of claim 2 wherein storing the frames in the buffer comprises storing the frames in a first-in-first-out (FIFO) buffer.

4. The method of claim 3 wherein the FIFO buffer is a destructive FIFO, wherein words which are read out of the destructive FIFO are no longer stored in the destructive FIFO.

5. The method of claim 3 wherein the FIFO buffer is a RAM buffer, wherein words which are read out of the RAM buffer remain in the RAM buffer until overwritten.

6. The method of claim 2 wherein the method is implemented in a switch which is configured to route frames which are read out of the buffer.

7. The method of claim 2 wherein the frames are received in streaming fashion and wherein storing the words and setting the early-EOF flags are performed in real time.

8. The method of claim 2 wherein the early-EOF flag in each word is stored as a single bit.

9. The method of claim 2 wherein for two consecutive words in the frame, the early_EOF flag of the first-received word is set if a K character bit of the subsequent word is set, and the early_EOF flag of the first-received word is cleared if the K character bit of the subsequent word is cleared.

10. The method of claim 9 wherein received words are processed through at least a first pipeline stage and then a second pipeline stage, wherein in the second pipeline stage, the early_EOF flag of the first-received word is set or cleared according to the K character bit of the subsequent word which resides in the first pipeline stage.

11. The method of claim 2 wherein storing the plurality of frames in the buffer comprises initially storing each word with the early-EOF flag cleared and subsequently scanning the stored words and setting the early-EOF flag for ones of the stored words that immediately precede stored words which comprise an EOF delimiters.

12. The method of claim 2 further comprising providing as output the words which are read out of the buffer, wherein the output words include the corresponding early_EOF flags.

13. The method of claim 2 further comprising providing as output the words which are read out of the buffer, wherein the early_EOF flags are removed from the output words.

14. The method of claim 2 wherein the read logic comprises a registered read controller.

15. The method of claim 2 wherein the read logic comprises a combinatorial read controller.

16. A buffer system comprising:
   a CPU; and
   a buffer;
   wherein the CPU is configured to receive frames which include a plurality of words, each frame having an end-of-frame (EOF) delimiter in the last word of the frame;
   wherein the CPU is configured to store the received frames in the buffer;
   wherein the buffer is configured to store an early-end-of-frame (early EOF) flag with each word;
   wherein the CPU is configured to identify the penultimate word in each frame and to set the early EOF flag in the penultimate word; and
   wherein the CPU is configured to read an individual frame from the buffer by reading the first word of the frame, continuing to read consecutive words from the buffer until a word having the early EOF flag set is read, reading the word immediately following the word having the early EOF flag set, and then stopping.

17. The buffer system of claim 16 wherein the buffer comprises a first-in-first-out (FIFO) buffer.

18. The buffer system of claim 16 wherein the FIFO buffer comprises a destructive FIFO, wherein words which are read out of the destructive FIFO are no longer stored in the destructive FIFO.

19. The buffer system of claim 16 wherein the FIFO buffer comprises a RAM buffer, wherein words which are read out of the RAM buffer remain in the RAM buffer until overwritten.

20. The buffer system of claim 16 wherein the buffer system is configured to be implemented in a switch, wherein the switch is configured to route frames which are read out of the buffer.

21. The buffer system of claim 16 wherein the buffer system is configured to receive frames in streaming fashion and to store the words and set the early EOF flags in real time.

22. The buffer system of claim 16 wherein the buffer system is configured to store the early EOF flag in each word as a single bit.

23. The buffer system of claim 16 wherein the CPU is configured to receive two consecutive words, to determine whether the later-received word comprises an EOF delimiter and to set the early_EOF flag of the first-received word if the later-received word comprises an EOF delimiter and clear the early_EOF flag of the first-received word if the later-received word does not comprise an EOF delimiter.

24. The buffer system of claim 16 wherein the CPU is configured to initially store each word with the early EOF flag cleared and to subsequently scan the stored words and set the early EOF flag for ones of the stored words that immediately precede words comprising EOF delimiters.

25. The buffer system of claim 16 wherein the buffer system is configured to provide as output the words which are read out of the buffer, wherein the output words include the corresponding early_EOF flags.

26. The buffer system of claim 16 wherein the buffer system is configured to provide as output the words which are read out of the buffer, wherein the early_EOF flags are removed from the output words.

27. A buffer system comprising:
   a receive buffer configured to store a plurality of frames of data,
      wherein each of the plurality of frames of data includes a plurality of data words, and
      wherein each of the plurality of data words includes payload data, a K character bit and an early-end-of-frame flag;
   write logic coupled to the receive buffer,
      wherein the write logic is configured to write each of the plurality of frames of data to the receive buffer, and
      wherein the write logic is configured to examine each of the plurality of frames of data and, for each of the frames of data, to set the early-end-of-frame flag in the next-to-last data word; and
   read logic coupled to the receive buffer,
      wherein the read logic is configured to read each of the frames of data out of the receive buffer, one frame at a time, and
      wherein when the read logic reads one of the plurality of frames of data, the read logic is configured to begin reading successive data words from the receive buffer, to examine each successive data word read from the receive buffer to determine whether the early-end-of-frame flag of each successive data word is set, to continue reading successive data words from the receive buffer until a data word having the corresponding early-end-of-frame flag set is detected, to read a last data word which follows the data word having the corresponding early-end-of-frame flag set, and then to terminate the read.

28. The buffer system of claim 27 wherein the read logic comprises a registered read controller.

29. The buffer system of claim 27 wherein the read logic comprises a combinatorial read controller.

30. The buffer system of claim 27 wherein the write logic comprises at least a first pipeline stage and a second pipeline stage, wherein an early_EOF flag of a word in the second pipeline stage is set if the K character bit of a subsequent word in the first pipeline stage is set and cleared if the K character bit of the subsequent word in the first pipeline stage is cleared.

\* \* \* \* \*